United States Patent [19]
Majeed et al.

[11] Patent Number: 5,897,130
[45] Date of Patent: Apr. 27, 1999

[54] CHASSIS CONTROL SYSTEM FOR CONTROLLING A VEHICLE CHASSIS SYSTEM BASED ON WHEEL SPEED DATA

[75] Inventors: Kamal Naif Majeed, Centerville; Richard Edward Longhouse, Dayton; Albert Victor Fratini, Jr., Kettering; Donald Edward Schenk, Vandalia; John Francis Hoying, Centerville, all of Ohio

[73] Assignee: General Motors Corporation, Detroit, Mich.

[21] Appl. No.: 08/441,369

[22] Filed: May 15, 1995

[51] Int. Cl.$^6$ .............................. B60G 17/00; B60G 17/15
[52] U.S. Cl. ...................... 280/707; 188/282.1; 303/144; 364/424.05
[58] Field of Search .................... 280/707, 688, 280/703, 840; 364/426.01, 426.02, 426.05; 188/299; 180/902, 141, 142, 143; 324/166, 160; 303/168, 194, 195, 196

[56] References Cited

U.S. PATENT DOCUMENTS

| | | | |
|---|---|---|---|
| 4,634,142 | 1/1987 | Woods et al. | 270/707 |
| 4,826,206 | 5/1989 | Immega | 280/711 |
| 4,905,783 | 3/1990 | Bober | 180/142 |
| 4,912,967 | 4/1990 | Shiraishi et al. | 73/105 |
| 4,924,392 | 5/1990 | Kurosawa | 364/424.05 |
| 4,937,748 | 6/1990 | Yonekawa et al. | 364/424.05 |
| 5,013,062 | 5/1991 | Yonekawa et al. | 280/707 |
| 5,056,812 | 10/1991 | Takehara et al. | 280/707 |
| 5,062,657 | 11/1991 | Majeed | 280/707 |
| 5,062,658 | 11/1991 | Majeed | 280/707 |
| 5,071,157 | 12/1991 | Majeed | 280/707 |
| 5,097,419 | 3/1992 | Lizell | 364/424.05 |
| 5,142,476 | 8/1992 | Shibata et al. | 364/424.05 |
| 5,276,621 | 1/1994 | Henry et al. | 364/424.05 |
| 5,410,482 | 4/1995 | Kimura et al. | 364/424.05 |
| 5,444,621 | 8/1995 | Matsunaga et al. | 280/707 |

FOREIGN PATENT DOCUMENTS

| | | | |
|---|---|---|---|
| 0552435 A2 | 11/1992 | European Pat. Off. | B60G 17/015 |
| 06048139 | 2/1994 | European Pat. Off. | |
| 0672548 A2 | 2/1995 | European Pat. Off. | B60G 17/015 |
| 4219012 A1 | 6/1992 | Germany | |

OTHER PUBLICATIONS

Vehicle Body Motion Detection Algorithm Using Wheel Speed Signal—Application to Suspension Control System, H. Tokuda, T. Murai, N. Nakashima, E. Matsunaga & H. Minabe; Nippon Denso Co., Ltd. and Toyota Motor Corporation; SAE #928261; Japan SAE #924106 Oct. 6, 1992.

*Primary Examiner*—Matthew C. Graham
*Attorney, Agent, or Firm*—Anthony Luke Simon

[57] ABSTRACT

A chassis system control method comprising the steps of measuring rotational speed of a plurality of vehicle wheels; estimating, responsive to each wheel rotational velocity, a relative velocity between the wheel and a corresponding corner of a vehicle body; determining a chassis system control command responsive to the estimations; and applying the chassis system control command to control the chassis system responsive to the estimations, wherein need for body to wheel relative position and/or relative velocity sensors is eliminated.

4 Claims, 7 Drawing Sheets

CHASSIS CONTROL SYSTEM FOR CONTROLLING A VEHICLE CHASSIS SYSTEM BASED ON WHEEL SPEED DATA

This application is a continuation in part of pending United States patent application, entitled "Suspension System Control," assigned to the assignee of this invention and the disclosure of which is incorporated herein by reference. This application is related to the subject of pending patent application, Ser. No. 08/235,733, filed Apr. 29, 1994, assigned to the assignee of this invention, and the disclosure of which is incorporated herein by reference.

This invention relates to a vehicle chassis system control.

BACKGROUND OF THE INVENTION

Many vehicles are marketed with controllable vehicle chassis systems. Example controllable vehicle chassis systems are anti-lock brake systems, traction control systems, and controllable variable force suspension systems. A typical anti-lock brake system includes wheel rotational velocity sensors that provide, for each wheel, an output signal indicative of wheel rotational velocity.

Pending U.S. patent application Ser. No. 08/235,733, filed Apr. 29, 1994, and assigned to the assignee of this invention described an automotive anti-lock braking system that uses vehicle wheel speed sensors, wheel-to-body relative position sensors and body corner accelerometers to affect a desired anti-lock braking control. U.S. Pat. No. 5,062,658, assigned to the assignee of this invention, describes a vehicle variable force suspension system control responsive to body-to-wheel relative position sensors and body corner accelerometers.

SUMMARY OF THE PRESENT INVENTION

A vehicle chassis controlled in accordance with the present invention is characterized by the features specified in claim 1.

Advantageously, this invention provides a vehicle chassis control system that gives control to a vehicle chassis system, such as an anti-lock brake system or a variable force suspension system, while eliminating the number of input devices necessary to control the system.

Advantageously, this invention may be used in a variable force suspension control system that provides control of the suspension system, including control based on relative velocity between vehicle wheels and corresponding corners of the vehicle body, modal velocities of the vehicle body, absolute vertical velocities of the vehicle body corners and wheels and/or absolute or relative vertical accelerations of the vehicle body corners and wheels, without requiring use of relative position or velocity sensors between the vehicle body and wheels and without requiring use of one or more body accelerometers.

Advantageously, this invention may be used in a vehicle chassis control system that provides anti-lock braking for the vehicle responsive to changes in tire normal force or changes in suspension system mode of operation, i.e., wheel hop, etc., without requiring use of a body-to-wheel relative velocity sensor, a body-to-wheel relative position sensor, a body corner accelerometer or any other type of body accelerometer.

In an advantage provided by this invention, it is recognized that vehicle wheel rotational velocity as sensed by a vehicle wheel rotational velocity sensor, when properly conditioned, tracks or closely correlates to the vertical relative velocity between that wheel and the corresponding corner of the vehicle body. In an advantage provided by this invention, wheel rotational velocity of the type normally sensed in vehicle ABS and traction control systems is used to provide chassis system control information of the type previously available only through implementation of additional sensors such as wheel-to-body relative position sensors, wheel-to-body relative velocity sensors, body-corner accelerometers and/or body modal accelerometers.

Advantageously, this invention allows control of a vehicle chassis system such as an anti-lock brake system, traction control system and/or suspension system with full control information while eliminating a multiplicity of sensors previously required and taking advantage of sensor information already available in many vehicles.

According to a preferred embodiment of this invention, a vehicle chassis control is provided according to the steps of sensing rotational velocity of a vehicle wheel, determining a signal representative of relative velocity between the vehicle wheel and a corresponding corner of a vehicle body responsive to the sensed rotational velocity of the wheel, developing a control command responsive to the signal representative of relative velocity, and controlling a chassis system responsive to the control command.

BRIEF DESCRIPTION OF THE DRAWINGS

The present invention will now be described by way of example with reference to the accompanying drawings in which.

DETAILED DESCRIPTION OF THE INVENTION

Figure 1A:
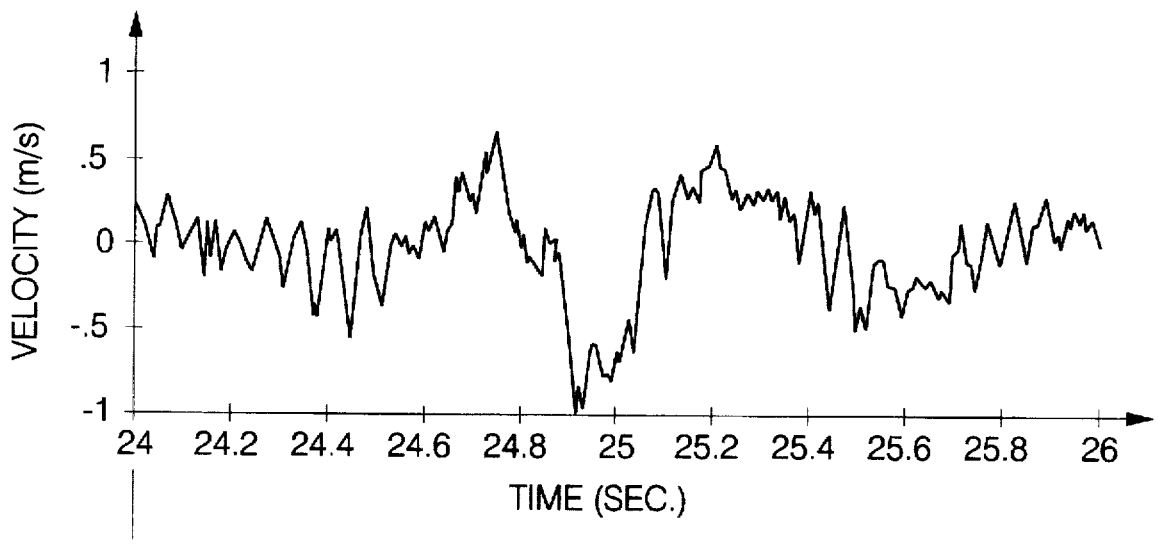
FIGS. 1A and 1B illustrate the correlation according to this invention between corner relative velocity and rotational speed of the corner's wheel.
Figure 1B:
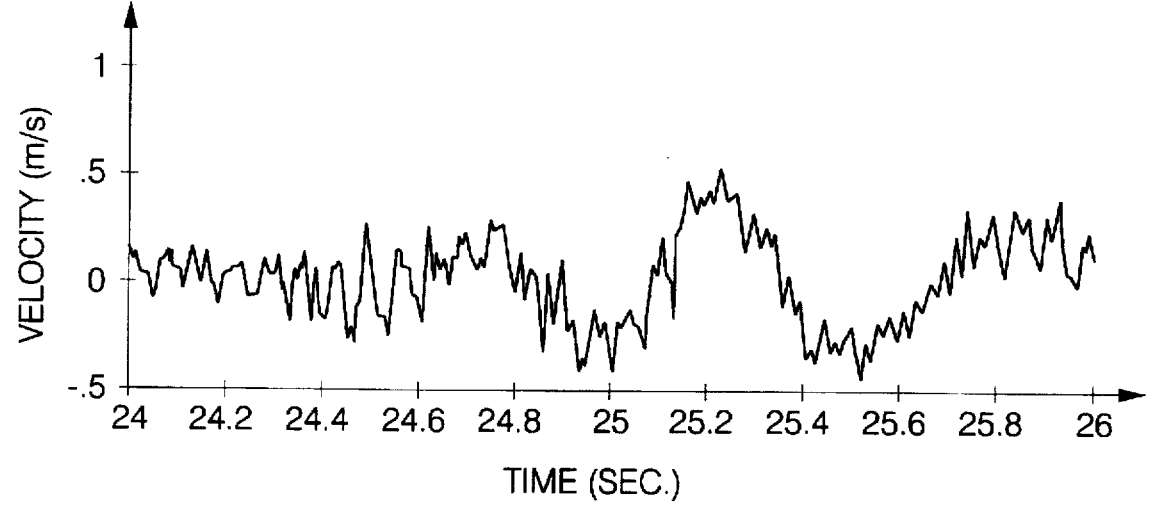

Referring to FIGS. 1A and 1B, the plots shown illustrate a recording of an example suspension system event of a test vehicle's right front wheel going over a bump on the road. FIG. 1A is the corner relative velocity signal, which is the vertical relative velocity between the vehicle wheel and corresponding corner of the vehicle body, and FIG. 1B is the wheel rotational speed signal, which is a wheel rotational speed signal of the type sensed in an anti-lock braking system having been high pass filtered to eliminate any DC components.

An example sensor for providing the wheel speed sensor is a typical anti-lock brake system wheel speed sensor, for example, a toothed ring that rotates with the wheel and a fixed variable reluctance sensor that creates a stream of pulses having a frequency proportional to the rotational speed of the toothed ring. The rotation of the toothed ring is proportional to the radius of the tire/wheel. As the tire radius decreases, the wheel and ring rotate faster and as the tire radius increases, the wheel and ring rotate slower. Disturbances in the road and the vehicle load transfer cause the tire to deflect, and a resulting radius change. For example, when a vehicle comes to a rise in the road, the vehicle body will be traveling, relative to the road, downward as the vehicle first hits the rise, upward as the vehicle passes the peak of the rise, then downward, as the vehicle exits the rise. In this event, the suspension and tires will compress, expand, and compress again with the downward, upward and then downward movement of the body. The resulting suspension compression, expansion and compression is measured as a change in the relative positions or velocities between the wheels and the body and the compression, expansion and compression of the tires causes the tires to rotate faster, slower, then faster so that a proportional wheel speed signals are produced.

As can be seen by the two graphs and as recognized according to this invention, the corner relative velocity signal tracks in phase and magnitude the high pass filtered wheel speed signal. According to this invention, therefore, there is provided a method for making use of the wheel speed signal to estimate the same information provided by the relative velocity signal. Thus, the sensor that provides the relative velocity signal, which may be either a relative velocity sensor or a relative position sensor whose output is differentiated, is no longer necessary to achieve full functioning suspension control.

For example, by implementation of this invention into the suspension control of the type set forth in the above-mentioned U.S. Pat. No. 5,062,658, the relative position sensors illustrated therein are no longer necessary. Similarly, by taking advantage of the present invention in a system such as the type set forth in the above-mentioned pending patent application Ser. No. 08/235,733, the control described therein is achieved without requiring use of the relative position sensors described therein. Further, by using the present invention in the system set forth in pending application, Attorney Docket No. H-178734, the accelerometers mounted on the body in the above-mentioned U.S. Pat. No. 5,062,658 and the above-mentioned co-pending patent application Ser. No. 08/235,733, are eliminated.

Accordingly, this invention makes use of wheel speed information that is already available on many vehicles due to the presence of an ABS and/or traction control system to provide the same information previously provided by as many as eight additional sensors, four relative position (or velocity) sensors and four corner accelerometers. Use of this invention to eliminate these eight sensors provides a substantial cost benefit in the form of component and wiring savings without sacrifice to suspension system control.

Figure 2:
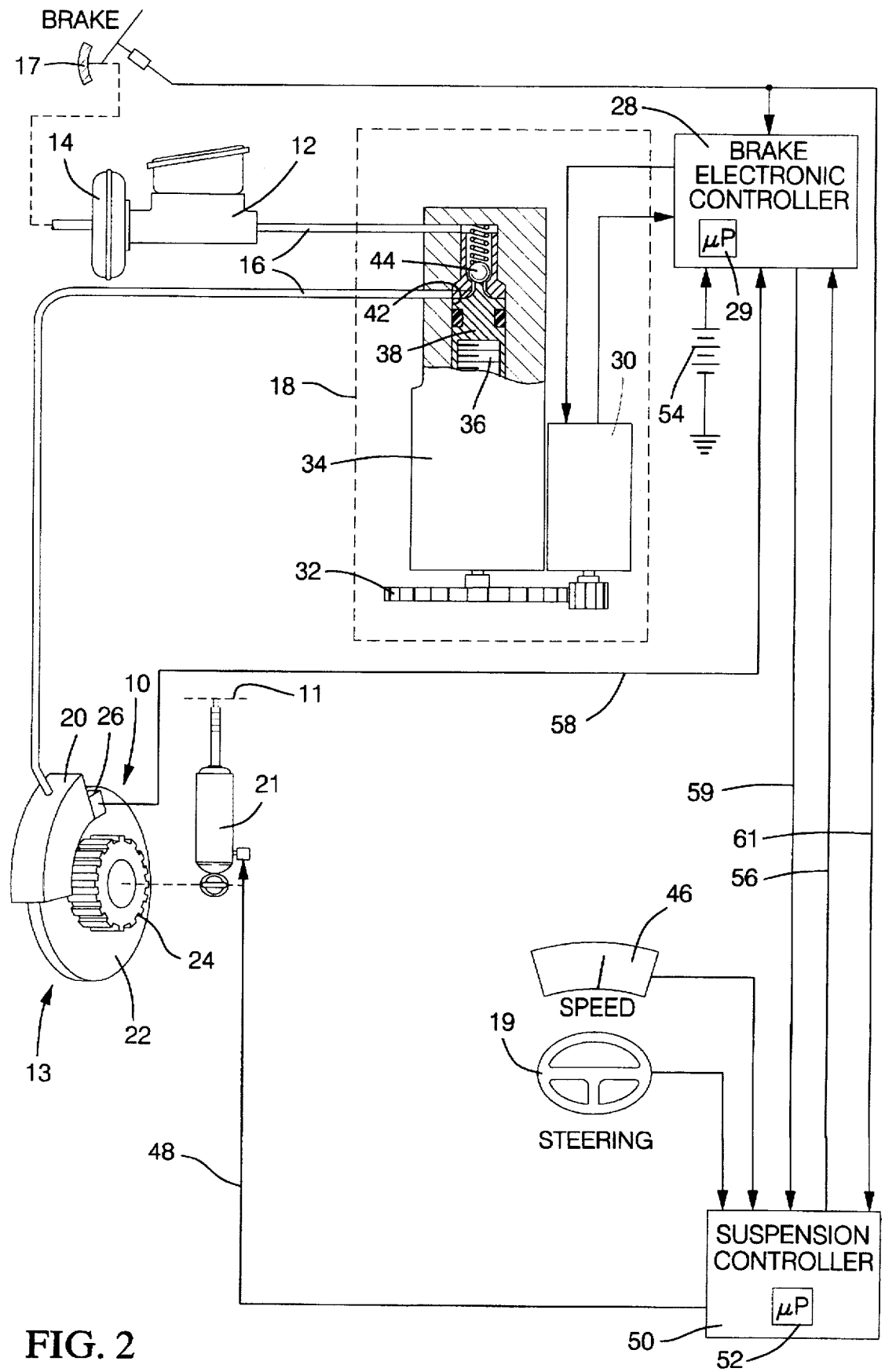
FIG. 2 illustrates a schematic of an example vehicle chassis control system according to this invention.

A chassis control system taking advantage of this invention to eliminate relative velocity or position sensors and body accelerometers might appear as in the schematic example set forth in FIG. 2. The example implementation of this invention shown illustrates this invention for use in a vehicle anti-lock braking system (that may or may not provide traction control) and in a variable force suspension system. It will be understood that the chassis control provided by this invention may be used in only one of such chassis systems and, while preferably used to control multiple chassis systems, need not be so used.

The wheel lock control system (anti-lock brake system) shown includes, in general, brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake line 16 and a pressure modulator 18. The brake unit 10 is illustrated as a disc brake system that includes a caliper 20 located at a rotor 22. The wheel includes a wheel sensing assembly comprised of an exciter ring 24 that rotates with the wheel and an electromagnetic sensor 26 that monitors the rotation of the exciter ring to provide a signal having a frequency proportional to the rotational speed of the wheel. The wheel rotational speed signal from the sensor 26 is provided to an electronic controller 28 that includes a microprocessor 29. The pressure modulator 18 is controlled by the electronic controller 28 in a known manner to limit the brake pressure applied to the wheel brake assembly 10 to prevent wheel lock-up. The modulator 18 is illustrated in an inactive position when it is transparent to the braking system. This is the modulator home position during normal vehicle braking.

In general, when the control senses a braking condition where at the wheel is approaching an incipient wheel lock-up, the pressure modulator 18 is controlled to regulate the braking pressure to the wheel to maintain the braking of the wheel in a stable braking region. The pressure modulator example shown includes a DC torque motor 30 having an output shaft that drives a gear train 32 that, in turn, rotates a linear ball screw actuator 34. The ball screw actuator contains a linearly stationary ball screw that when rotated, linearly positions a nut 36. The nut 36 terminates in a piston 38. As the linear ball screw rotates, the piston 38 is either extended or retracted depended on the direction of rotation of the torque motor 30. Modulator 18 includes a housing in which a cylinder 42 is formed. The piston 38 is reciprocally received within the cylinder 42. The cylinder 42 forms a portion of the fluid path between the master cylinder 12 and the wheel brake 10. Included within this fluid path is a normally closed ball check-valve 44 that, when closed, isolates the master cylinder 12 from the wheel brake unit 10. The ball check valve 44 is operated to an open position by the piston 38 when it is positioned in an extended (home) position within the cylinder 42 as illustrated in FIG. 2. When the ball screw check valve is open, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator.

However, when torque motor 30 is operated by the electronic controller 28 to modulate the braking pressure in the wheel brake unit 10, the piston 32 is retracted allowing the ball check valve to seek and isolate the master cylinder 12 from the wheel brake unit 10 as long as the pressure in the cylinder 42 is less than the pressure from the master cylinder 12. Further retraction of the piston 38 functions to increase the volume of the cylinder 42 thereby decreasing the pressure applied to the wheel brake unit 10. By controlling the DC torque motor 30 in a known manner, a pressure at the wheel brake can therefore be modulated to control values less than the master cylinder 12 pressure output until such time that the piston 38 again unseats the ball check valve 44 or until the pressure generated by the pressure modulator at the wheel brake 10 exceeds the fluid pressure output of the master cylinder 12. When this latter condition exists, the ball check valve 44 is opened by the differential fluid pressure, which limits the pressure of the wheel brake unit 10 at the master cylinder 12 pressure. In this manner, the wheel cylinder pressure can never exceed the operator's established pressure.

The vehicle body 11 is supported by four wheels 13 (only one shown) and by four suspensions including springs of a known type (not shown). Each suspension includes a variable-force real time controllable damper 21 (only one shown) connected to exert a vertical force between wheel 13 and body 11 at that suspension point. Although many such suspension arrangements are known and appropriate to this invention, actuator 21 of this example preferably comprises an electrically controllable, variable force damper in parallel with a weight bearing coil spring in a parallel shock absorber/spring or McPherson strut arrangement. A description of an example variable force damper suitable for use as actuator 12 is the continuously variable damper described in U.S. Pat. No. 5,282,645, assigned to the assignee of this invention.

The outputs of rotational velocity sensors 26, are processed in the brake controller 28 and provided to suspension controller 50, including microprocessor 52, which processes the signals to determine estimates of the corner body to wheel relative velocities and states of vehicle body 11 and wheels 13 and generates an output actuator control signal on line 48 for each variable force actuator 21. These signals are applied from controller 50 through suitable output apparatus to control actuators 21 in real time. Input signals for the determination of the output actuator control signals may also be provided to controller 50 by vehicle brake apparatus 17 to provide anticipation of vehicle pitch (lift/dive) or by a vehicle speed sensor 46 and a steering wheel angular position sensor 19 to provide anticipation of vehicle roll. Obtaining such signals is easily achieved through the use of known types of sensors available to those skilled in the art.

In this example, the suspension controller 50 provides, via line 56 to the brake electronic controller 28, signals representative of the state of operation of the vehicle suspension system, which states include suspension relative velocity, body absolute velocity, and/or wheel absolute velocity signals determined via implementation of this invention. Various implementations may very as to controller structure. The processing of the input signals can take place in either controller, as desired by the system designer, or a single controller can be implemented to control both suspension and brake functions.

With the exception of the improvements set forth herein and in the pending applications referred to herein, the control functions of the brake controller 28 and suspension controller 50, including signal input processing and output processing and the general brake and suspension control function, are of a type well known to those skilled in the art and further detail of the brake controller 28, suspension controller 50 and the controls implemented therein need not be set forth herein.

Figure 3:
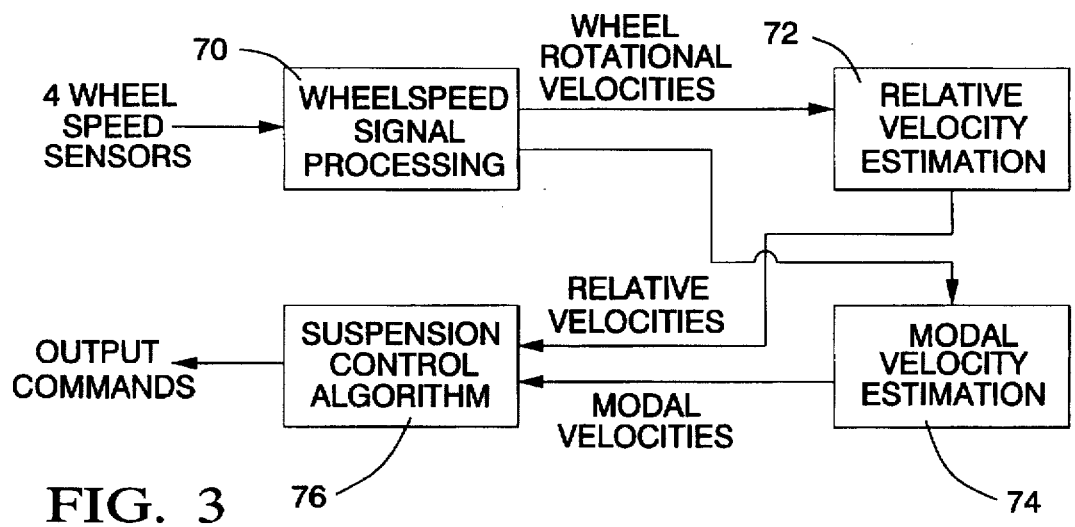
FIG. 3 illustrates schematically the control according to this invention for implementation into a controllable suspension system.

Beginning with FIG. 3, an example control structure according to this invention to affect the advantages recited herein is described. Referring to FIG. 3, the vehicle's four wheel rotational speed sensor signals are provided to block 70, which processes the wheel speed signals. In an example implementation, the wheel speed signals are provided from the sensor 26 via line 58 to brake controller 28, which converts the pulses on line 58 to wheel speed information based on the frequency of the pulses and the number of teeth in the exciter ring 24 in a known manner. If this determination is not already made when the wheel speed information is provided to block 70, block 70 performs the necessary conversion of the frequency information on line 58 to a wheel speed signal that can be used by the microprocessors 29 and 52 in the brake and suspension controllers, respectively.

At block 72, the wheel speed information is converted into estimates of the body-to-wheel vertical relative velocity, which estimates are used by the suspension control algorithm 76 to develop suspension output commands of a known type used to control the suspension actuator 21. The suspension control algorithm 76 may be any known type of control that makes use of body-to-wheel relative velocity information to perform suspension control. An example of such control is set forth in the above-mentioned pending application, Attorney Docket No. H-178734.

Many suspension controls also make use of body modal velocity information such as body heave, pitch and roll velocity to determine the suspension output commands. In such implementations, the wheel speed signals from block 70 then are also provided to block 74, which, responsively according to this invention, estimates the body modal velocities of body heave, pitch and roll. The estimated modal velocities are then provided from block 74 to block 76 where they are used in the suspension control.

In using the estimated relative velocities developed at block 72 and the estimated body modal velocities developed at block 74, this invention is implemented into a control of a known type at block 76. This is achieved by simply using the signals representing the estimated relative velocities and estimated modal velocities according to this invention in the control algorithm in place of the previously measured or derived relative velocity or modal velocity signals to affect the suspension control. For example, in the above-mentioned pending application Attorney Docket No. H-178734, the relative velocity signals are determined through differentiation of the outputs of a set of relative position sensors. The signals determined according to this invention at block 72 are used in place of the relative velocity signals determined from the relative position sensor outputs, thus allowing removal of the relative position sensors and associated circuits from the system.

Figure 4:
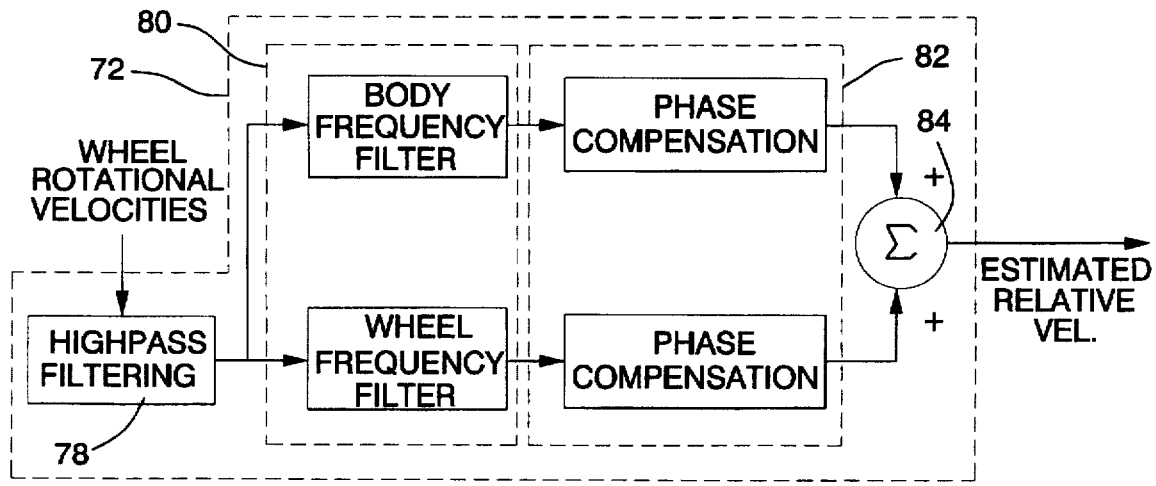
FIG. 4 illustrates an example control schematic for determining corner relative velocities according to this invention.

To understand more how the relative velocity estimation at block 72 is performed according to this invention, refer now to FIG. 4. In FIG. 4, block 78 receives the signals of the wheel rotational velocities and high pass filters the signals to remove any DC components.

The output of the filter 78 then is the frequency information from the wheel speed signal such as the type of information illustrated in FIG. 1B, which as shown by FIGS. 1A and 1B closely tracks the corner relative velocity. Block 80 then filters the output of block 78 to obtain the body and wheel components of the signal at block 78. For example, block 80 contains a filter to isolate the wheel resonance component of the signal output from block 78. The wheel resonance component typically has a frequency centering around 10 Hz, but may vary from vehicle to vehicle. Block 80 also contains a second filter for isolating the body resonance components of the signal from block 78. The body resonance component typically has a frequency in the 1 Hz range. Depending on the content of a signal output from block 78, the body frequency filter may be implemented as a band pass filter and may require an additional high pass filtering step to filter out body motions caused, not by suspension activity, but by vehicle acceleration, braking and cornering, typically having frequencies in the 0.5 Hz range or lower.

The outputs from block 80, the two signals representing the body and wheel frequency components of the wheel rotational velocities, may have phase shifted with respect to each other. In many cases, however, there may be no relative phase shift. The phase shift may be detected by comparing the output signals from block 80 with the original signal input to block 80. If a relative phase shift occurs, it is then desirable to add a phase compensation block 82, which may be implemented in the form of a lead-lag filter for one of or both of the component frequencies output from block 80. The resultant signals from blocks 80 and 82 are then summed at block 84 to develop the relative velocity estimates.

The steps shown in FIG. 4 are performed for each corner of the vehicle to develop the estimated relative velocities between each corner of the vehicle body and the corresponding vehicle wheel.

As explained above, the estimated relative velocity output from block 72 can be used in any suspension control scheme in place of relative velocity signals determined from relative position sensors, relative velocity sensors, or any other means. This invention, than, as described above provides a method of controlling an actuator responsive to a wheel rotational velocity signal comprising the steps of measuring the wheel rotational velocity signal, first filtering the wheel rotational velocity signal to remove DC components thereof, second filtering the first filtered signal to isolate body frequency components thereof, third filtering the first filtered signal to isolate wheel frequency components thereof, summing the second and third filter output to determine a signal indicative of an estimated relative velocity between the wheel and a vehicle body, developing an actuator control command responsive to the estimated relative velocity, outputting the actuator control command to an actuator.

Figure 5:
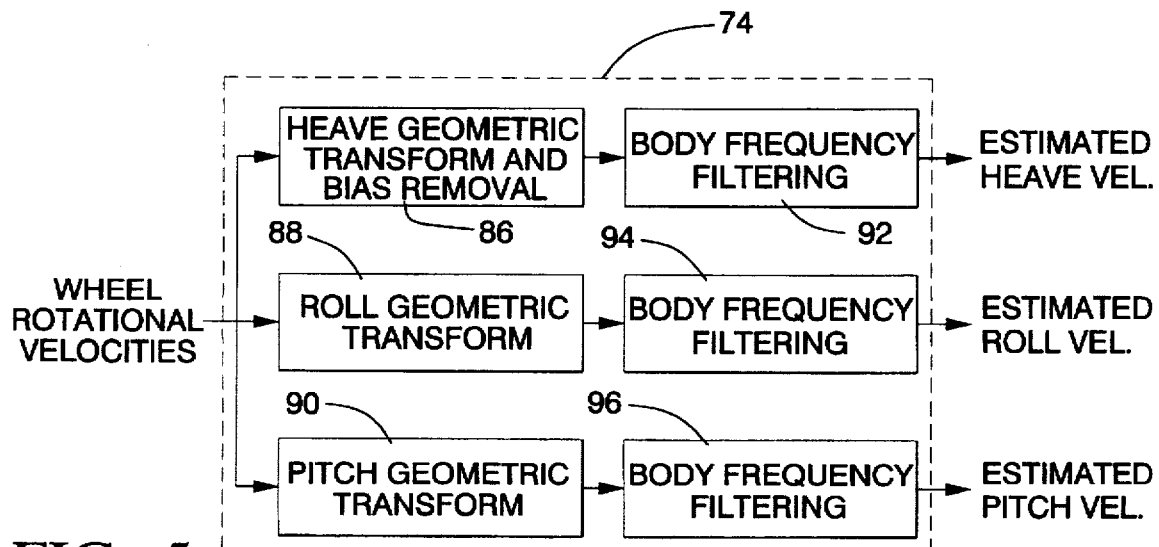
FIG. 5 illustrates an example control for determining body modal heave, roll and pitch velocities according to this invention.

Referring again to FIG. 3 and now also to FIG. 5, the estimation of the body modal velocities according to this invention, achieved at block 74, is now described in more detail. In FIG. 5, the wheel rotational velocities are provided to block 86, removes the DC components of the rotational velocity signal and performs a heave geometric transformation of the signals to achieve what may be referred to as the "relative heave velocity" between the vehicle body and wheels. The heave transformation may be implemented as follows:

$$H_R = (\omega_{LF} + \omega_{RF} + \omega_{LR} + \omega_{RR})/4,$$

where $H_R$ is the relative heave velocity, $\omega_{LF}$ is the left front wheel rotational velocity, $\omega_{RF}$ is the right front wheel rotational velocity, $\omega_{LR}$ is the left rear wheel rotational velocity and $\omega_{RR}$ is the right rear wheel rotational velocity.

The DC bias is removed from the relative heave velocity by filtering the relative heave velocity through a first order low pass filter implemented as:

$$y(n) = a_0 x(n) - b_0 y(n-1),$$

where y(n) is the filter output, x(n) is the filter input and $a_0$ and $b_0$ are filter constants. Example filter constant values are $a_0 = 0.0310689$ if the vehicle is accelerating or braking and otherwise is 0.0062692; $b_0 = -0.9777877$ if the vehicle is accelerating or braking and otherwise is −0.995556. Any known method for determining whether the vehicle is accelerating or braking may be used to control switching of the constant values.

The output of the low pass filter is subtracted from the relative heave velocity to remove bias to provide the resultant signal used for indicating relative heave velocity.

The resultant relative heave signal from block 86 is then provided to block 92, which performs a filter function to isolate the body frequency component of the relative heave signal. The body frequency component is typically in the 1 Hz range. An example discrete implementation of the body frequency filter at block 92 is a band pass filter followed by a low pass filter in series. An example band pass filter implementation is:

$$y(n) = a_1 * (x(n) - x(n-1)) - b_1 * y(n) - b_0 * y(n-2),$$

where y(n) is the band pass filter output, x(n) is the filter input, and $a_1$, $b_1$ and $b_0$ are filter constants having example values of 0.014966, −1.984977 and 0.9850335, respectively. An example low pass filter implementation is:

$$y(n) = a_0 * x(n) - b_0 * y(n-1),$$

where y(n) is the filter output, x(n) is the filter input, and $a_0$ and $b_0$ are filter constants having example values of 0.0195198 and −0.9924885, respectively.

The output from block 92 is the estimated body heave velocity and can be used in a suspension control algorithm in place of a body heave velocity signal determined by prior known methods (i.e., such as derived from one or more body accelerometer signals).

The wheel rotational velocities are also provided to blocks 88 and 90, which perform the roll and pitch geometric transformations, respectively. Because of the design of the roll and pitch geometric transformations at blocks 88 and 90, DC components from the wheel rotational velocities are automatically canceled and therefore implementation of block 78 to remove the DC components of the signals is not necessary before performing the roll and pitch transform.

The roll transform at block 88 determines what may be referred to as the "relative roll velocity" between the vehicle body and wheels and may determined in one of two ways. The first example implementation is:

$$R_R = (-\omega_{LF} - \omega_{LR} + \omega_{RF} + \omega_{RR})/(2*TW),$$

where $R_R$ is the relative roll velocity and TW is the track width or distance between the left and right front (or rear) wheels of the vehicles. This example implementation takes into account all four wheel speed inputs. In some implementations it may be found that design of one of the front or rear suspensions may introduce noise into the wheel rotational velocity signals in a manner that adversely affects roll transform. In such instances, roll transform may be achieved using only the other suspension, that is the rear or front, and will take the equivalent form:

$$R_R = (-\omega_{LF} + \omega_{RF})/(2*TW), \text{ or}$$

$$R_R = (-\omega_{LR} + \omega_{RR})/(2*TW).$$

The relative roll velocity is then filtered at block 94 to isolate the body frequency components of the relative roll velocity signals to thereby determine the body roll velocity. An example filter for block 94 includes a band pass filter and a low pass filter in series. An example implementation of the band pass filter is as described above with respect to the heave velocity filter, with example filter constant values as follows: $a_1 = 0.0199051$ if the steering wheel angle magnitude is less than 5 degrees, and otherwise is 0.005014; $b_1 = -1.9799945$ if the steering wheel angle magnitude is less than 5 degrees, and otherwise is −1.9948853; $b_0 = 0.9800946$ if the steering wheel angle is less than 5 degrees and otherwise is 0.994986. Steering wheel angle can be measured through any known type of steering wheel angle sensor. An example implementation of the low pass filter is as described above with respect to the heave velocity filter, with example filter constant values as follows: $a_0=0.100027$ and $b_0=-0.9899973$.

The pitch geometric transform at block 90 determines what may be referred to as the "relative pitch velocity" between the vehicle body and wheels. An example implementation of the pitch geometric transform is:

$$P_R=(-\omega_{LF}-\omega_{RF}+\omega_{LR}+\omega_{RR})/(2*WB),$$

where $P_R$ is the relative pitch velocity and WB is the wheel base or distance between the front and rear wheels of the vehicle.

The relative pitch velocity is then filtered at block 94 to isolate the body frequency components of the relative pitchy velocity signals to thereby determine the body pitch velocity. An example filter for block 96 includes a band pass filter and a low pass filter in series. An example implementation of the band pass filter is as described above with respect to the heave velocity filter, with example filter constant values as follows: $a_1=0.014966$; $b_1=-1.984977$; $b_0=0.9850335$. An example implementation of the low pass filter is as described above with respect to the heave velocity filter, with example filter constant values as follows: $a_0=0.049951$ and $b_0=-0.9875123$.

In general, the filters at blocks 94 and 96 are centered primarily around the 1 Hz frequency but may vary from vehicle to vehicle. An additional high pass filter step may be required to filter out body behavior caused by vehicle acceleration, braking and cornering, which typically comprise components in the 0.5 Hz. frequency and lower ranges.

The signals output from block 74 are the estimated body heave, roll and pitch velocities.

Figure 6:
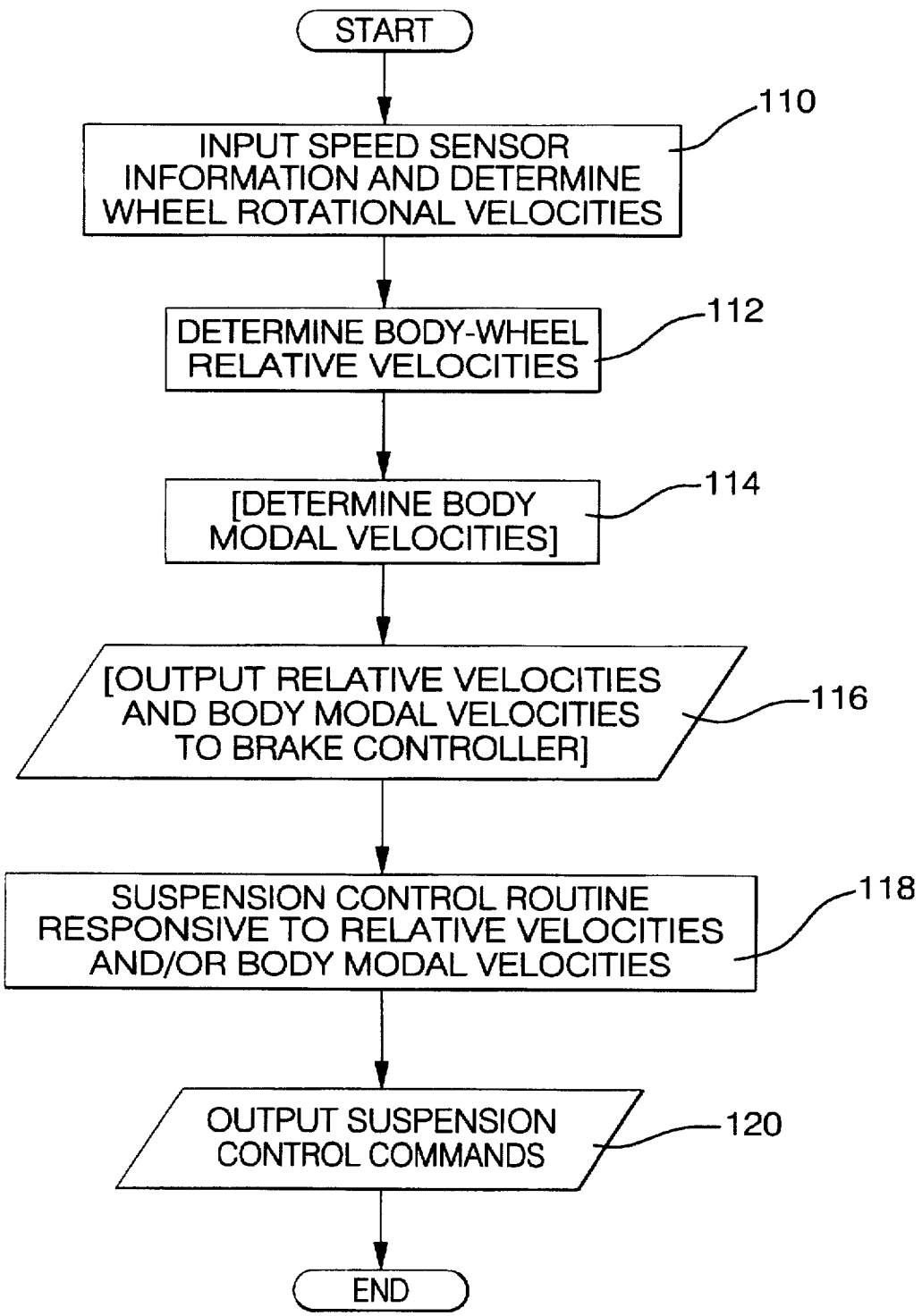
FIGS. 6, 7 and 8 are flow diagrams illustrating implementation of this invention in an example suspension control.

Referring now to FIG. 6, an example control routine implemented by a suspension controller using this invention to control the variable force suspension actuators starts and moves to block 110 where it inputs the speed sensor information from the vehicle wheel rotational velocity sensors and determines the wheel rotational velocities. Alternatively, this step may be performed by the vehicle brake system controller and the result simply received by the suspension controller through a data bus coupled to the brake controller. At block 112, the body-to-wheel relative velocities are determined according to this invention in response to the wheel rotational velocity. Block 112 will be explained in more detail further below with reference to FIG. 7.

The routine then moves to block 114 where it determines the body modal velocities, which are used by many suspension control systems. Block 114 will be explained in more detail further below with reference to FIG. 8.

The routine then moves to block 116 where it outputs to the brake controller the relative velocities and body modal velocities estimated according to this invention so that this invention may be used in a brake control system. Examples of such use will be set forth further below with respect to FIGS. 9 and 10.

At block 118 the suspension controller runs its suspension control routine responsive to the relative velocities and body modal velocities estimated according to this invention. It will be understood by those skilled in the art that the suspension control routine block 118 is generic and can be any suspension control routine implemented to use the estimated relative velocities according to this invention and/or the estimated body modal velocities determined according to this invention. Example control routines are set forth in the above-mentioned U.S. Pat. No. 5,062,658 and application Attorney Docket No. H-178734, the disclosures of which are both incorporated herein by reference. It will also be recognized by one skilled in the art that there are a variety of suspension control routines in the public domain and available to those skilled in the art that make use of relative velocity signals and/or body modal velocity signals and any such control routines may be implemented as block 118 to be used with this invention. Because with the exception of the improvements herein, the details of particular routines are known to those skilled in the art and are not central to the understanding of this invention, further details of such routine will not be set forth herein.

After the suspension control routine at block 118 determines suspension control commands for the variable force actuator responsive to the relative velocity signals and/or body modal velocity signals estimated according to this invention, the routine moves to block 120 where it outputs the suspension control commands to control the variable force suspension.

Figure 7:
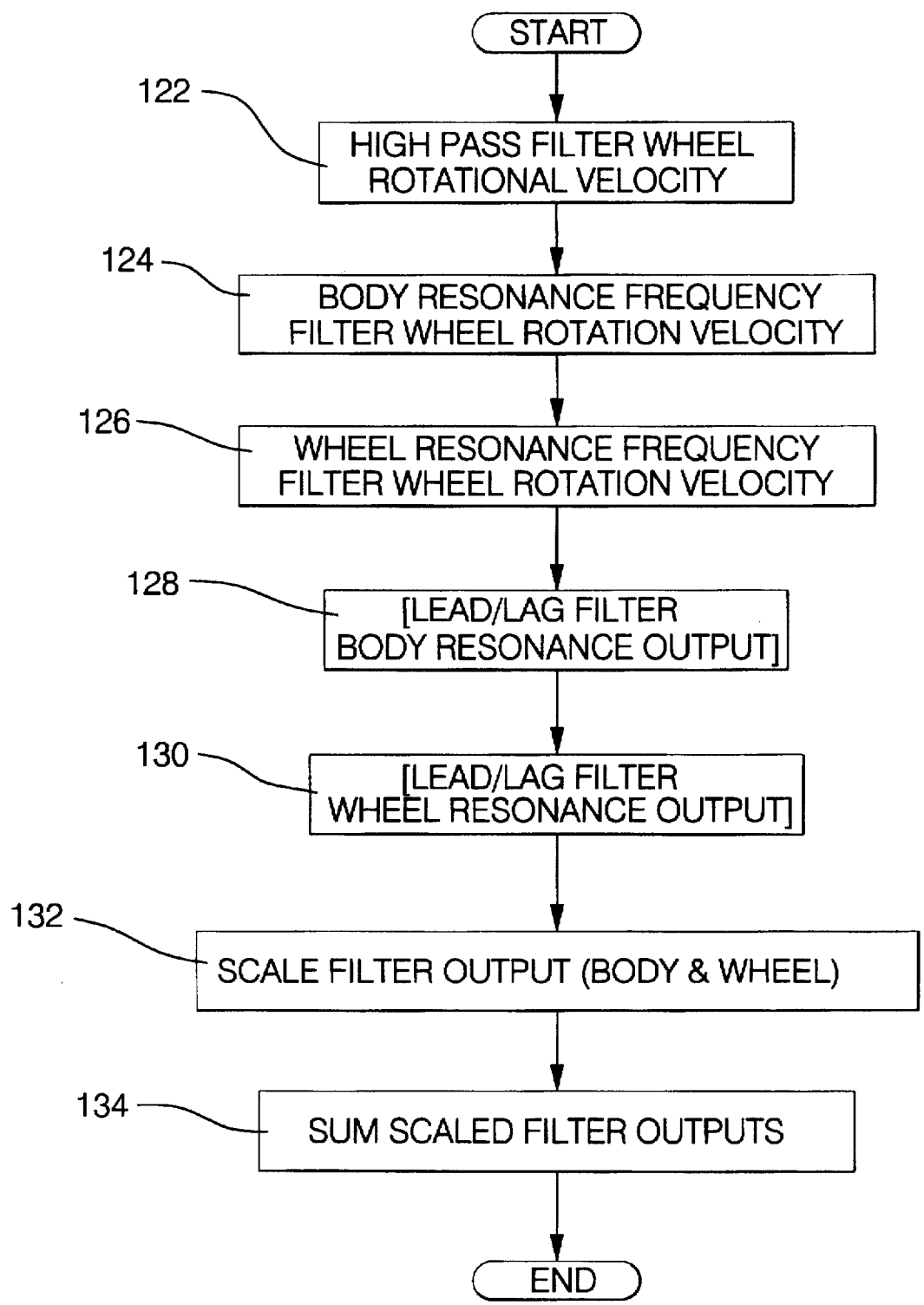

Referring now to FIG. 7, the body to wheel relative velocity estimation routine shown is performed four times, once for each corner of the vehicle to determine the four relative velocity estimations. At block 122, the wheel rotational velocity signal for a particular corner of the vehicle is high pass filtered to remove any DC components. An example filter implementation is a second order high pass filter having a discrete implementation as follows:

$$H(n)=x(n)+a_1x(n-1)+a_0x(n-2)+b_1H(n-1)+b_0H(n-2),$$

where $H(n)$ is the filter output, $x(n)$ is the filter input, $a_1$, $a_0$, $b_1$ and $b_0$ are constants, example values of which are $a_1=-1.999922$, $a_0=0.999922$, $b_1=1.1982226$ and $b_0=-0.982383$.

The routine then moves to block 124 where the high pass filtered wheel rotational velocity signal is filtered by a body resonance frequency band pass filter to separate out the body component of the filtered wheel rotational velocity signal. An example implementation of the band pass filter is as described above with respect to the heave velocity filter (FIG. 5, block 92), with filter constant values as follows: $a_1=0.007511$, $b_1=-1.992432$ and $b_0=0.992488$.

The routine then moves to block 126 where the wheel rotational velocity signal filtered at block 122 is filtered by a wheel resonance frequency filter, which is either a high pass filter or a band pass filter. An example implementation of the band pass filter is as described above with respect to the heave velocity filter (FIG. 5, block 92), with filter constant values as follows: $a_1=0.0078347$, $b_1=-1.915162$ and $b_0=0.921565$.

After block 126, blocks 128 and 130 may be implemented if the designer desires to compensate for lag introduced through the signal processing. To compensate for lag, blocks 128 and 130 may implement lead-lag filters to process the outputs of the body and wheel resonance frequency filters at blocks 124 and 126. An example suitable lead-lag filter may be a single pole infinite impulse response high pass filter implemented to provide the desired amount of phase lead and tailored to body frequencies at block 128 and wheel hop or wheel resonance frequencies at block 130.

The generic discrete implementation of the lead-lag filter is as follows:

$$Y(k)=A*X(k)-B*X(k-1)+C*Y(K-1),$$

where Y is the lead-lag filter output, A, B and C are the filter constants, $X(k)$ is the filter input provided from the body or wheel resonance filter, $X(k-1)$ is the previous input, and $Y(k-1)$ is the previous lead-lag filter output. In certain microprocessor implementations of the filter, because the lead-lag filter coefficients A, B and C may assume values greater than 1, intermediate computations could overflow if the coefficients are applied directly. In order to avoid this, scale factors of 0.5 are applied to the intermediate computations so that each coefficient is effectively divided by 2 during execution of the filter equation. The resultant sum of the filter is then multiplied by 2.0 in order to retain the original output scaling. In an example implementation, roughly 20 degrees of phase lead at a wheel hop frequency of 14 Hz. results in calibration of A, B and C to 1.952 to 1.8564 and 0.9043, respectively. Those skilled in the art of digital filtration techniques can easily recalibrate the filter for other desired filter leads that will vary from system to system.

In other implementations, the lead-lag filters at blocks 128 and 130 are not necessary and the system designer will be satisfied with the outputs from blocks 124 and 126. At block 132, the outputs of the lead-lag filters at blocks 128 and 130, if implemented, or, otherwise, from the filters at blocks 124 and 126, are scaled as appropriate so that the filter outputs can be summed at block 134. The scale factors can be easily determined by one skilled in the art as, for example, the ratio of actual measured body and wheel velocities to the corresponding filter outputs (124, 126 or 128, 130). At block 134 the scaled filter outputs are summed as follows:

$$RV = f_{body(scaled)} - f_{wheel(scaled)}$$

where $f_{body(scaled)}$ and $f_{wheel(scaled)}$ are the outputs from block 132.

The result at block 134 is the estimated body-to-wheel relative velocity determined according to this invention for a particular corner of the vehicle responsive only to one measured signal, the rotational velocity of the wheel at that corner of the vehicle. The estimated relative velocity according to this invention is an accurate estimation of body-to-wheel relative velocity obtained without use of a relative position, relative velocity or acceleration sensor.

Figure 8:
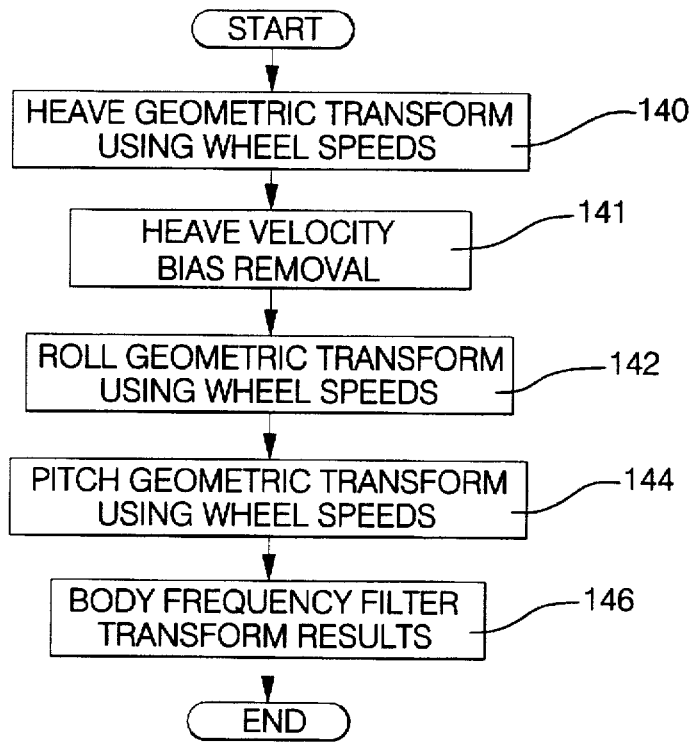

Referring now to FIG. 8, a determination of the body modal velocities of heave, pitch and roll begins at blocks 140, 141, 142 and 144 where the heave, roll and pitch geometric transforms, using the wheel rotational velocity, are performed. The transforms are performed as described above with reference to FIG. 5 and the results are signals indicative of the relative heave, roll and pitch velocity between the vehicle body and wheels. At block 146, the results of the transforms at blocks 140, 141, 142 and 144 are filtered by three body frequency filters to isolate from the relative heave, roll and pitch velocity signals the body components thereof to thereby obtain signals indicative of body heave, roll and pitch velocity.

The results of block 146 are the signals representing the estimated body heave, pitch and roll velocities for use in the suspension and/or brake control algorithms.

It may be necessary to scale the result of block 146 (or block 148) by scale factors for each of the heave, roll and pitch velocity estimations. The scale factors may be easily determined as the ratio of actual measured body modal velocities measured using accelerometers or other types of sensors in an experimental vehicle to the estimates determined at block 146.

Figure 9:
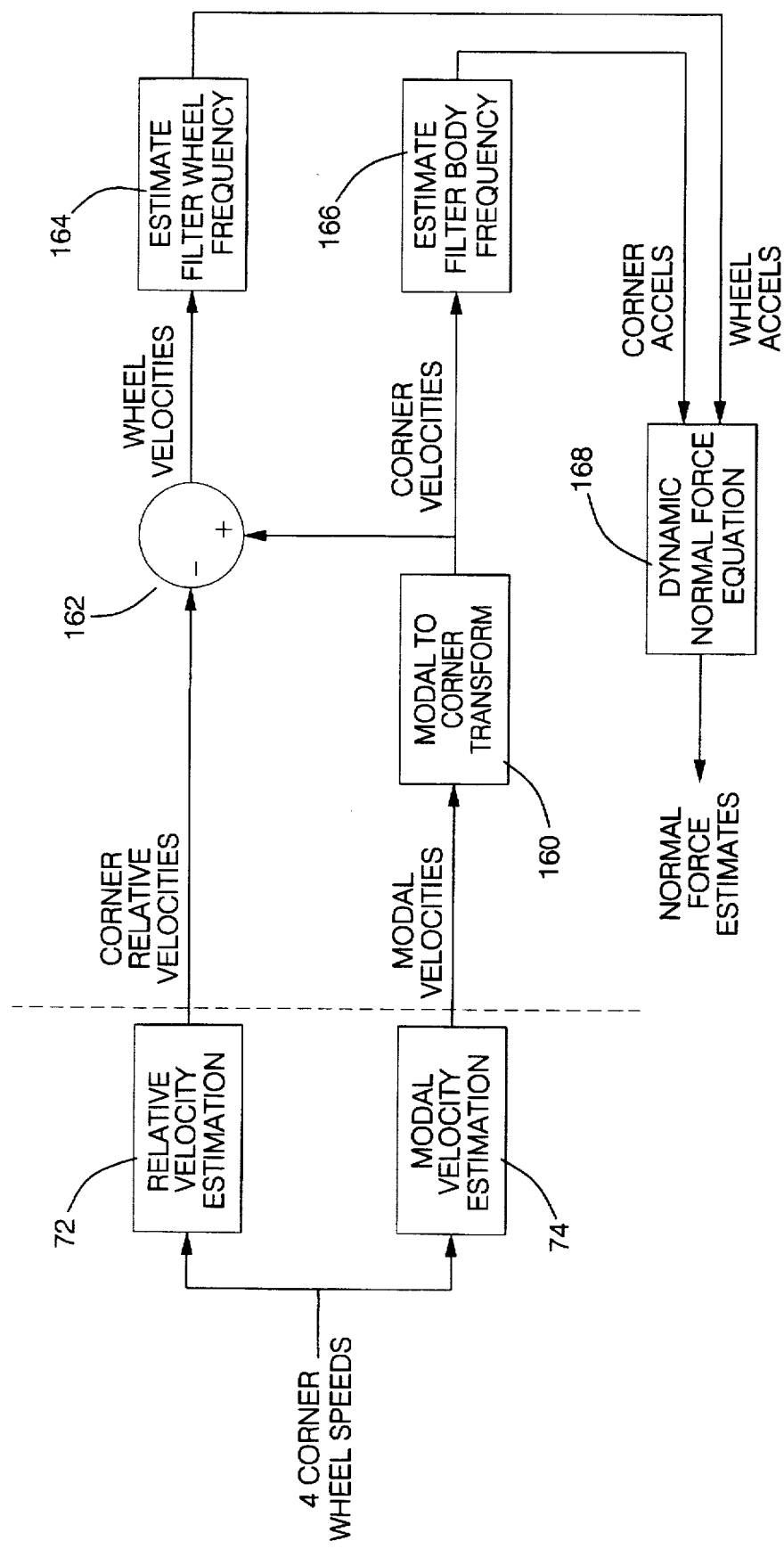
FIG. 9 is an example control diagram for implementation of this invention into an anti-lock brake control.

Referring to FIG. 9, the schematic control diagram illustrates a brake control system in which this invention is implemented. Blocks 72 and 74 described above with reference to FIGS. 3, 4, 7 and 8 illustrate the estimation of body-to-wheel relative velocities and body modal velocities responsive to the four corner wheel rotational velocity signals. These estimations are done, for example, in the suspension system controller. The relative velocity and body modal velocity estimations are then provided to the brake system controller, which performs the functions illustrated in blocks 160–168. The specific functions of blocks 160–168 are not part of the invention claimed herein but are set forth to illustrate the generic scope of this invention and its applicability to chassis control systems in general.

Block 160 performs a transform of the estimated modal velocities from block 174 into estimates of absolute corner velocities for the four corners of the vehicle body. The estimated body corner velocities output from block 160 are provided both to blocks 162 and 166. Block 162 sums each corresponding estimated corner relative velocity to the estimated body corner absolute velocity to obtain a difference thereof, the difference being an estimation of the absolute wheel vertical velocity for the corresponding corner of the vehicle. The estimated wheel velocity is then differentiated through a Kalman filter at block 164, as described in the above-mentioned co-pending application Ser. No. 08/235,733, to obtain an estimate of the absolute acceleration of each wheel.

Block 166 differentiates the estimated corner velocities through a Kalman filter to obtain an estimation of the absolute body corner acceleration for each corner of the vehicle body. The estimated body corner and wheel accelerations are then provided to block 168, which computes a dynamic normal force between each tire and the road responsive to the corner body and wheel accelerations and the known masses of the vehicle body and wheels. The resultant estimated normal forces between each wheel and the road are then used to control the braking system in the manner described in pending application U.S. Ser. No. 08/235,733. Because the details of such control are fully set forth in the pending application and are not central to this invention, they are not repeated herein.

Figure 10:
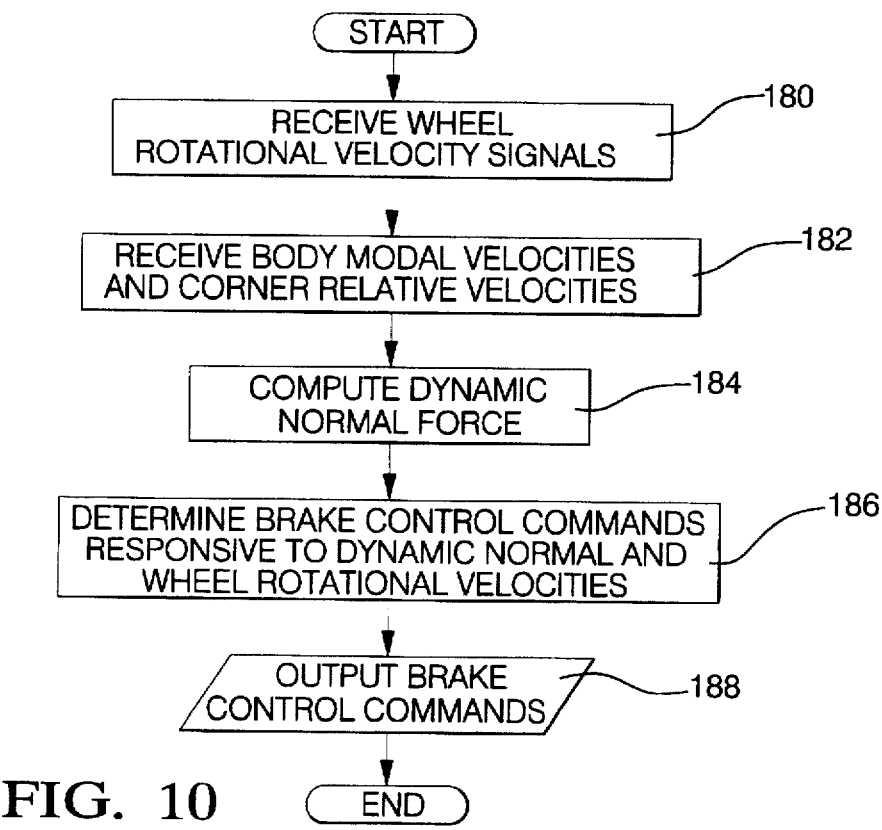
FIG. 10 is a flow diagram illustrating implementation of this invention into an anti-lock brake control.

Referring to FIG. 10, an example control diagram for the brake controller 28 shown in FIG. 2 begins and moves to block 180 where it receives the wheel rotational velocity signal and moves to block 182 where it receives, from the suspension controller, the body modal velocity and corner relative velocity estimates. Block 184 then determines the dynamic normal force for each wheel responsive to the corner body and wheel accelerations and known masses of the vehicle body and wheels.

The computed dynamic normal force at block 186 is then used in the determination of brake control commands responsive to both the dynamic normal force and wheel rotational velocities in the manner set forth in pending application Ser. No. 08/235,733. The resultant brake control commands are then output at block 188 to control the brake actuators to effect the desired braking response.

It will be understood by those skilled in the art that blocks 184, 186 and 188 are example implementations and that this invention may be used with any brake control algorithm that may be substituted for blocks 184, 186 and 188 to make use of the estimated body modal and/or corner velocities determined according to this invention. It will be also understood that the brake system and suspension system hardware illustrated are examples and any controllable brake and suspension system hardware may be used with this invention.

Various other improvements and modifications to this invention may occur to those skilled in the art and such improvements and modifications will fall within the scope of this invention as set forth below.

The embodiments of the invention in which an exclusive property or privilege is claimed are defined as follows:

1. A vehicle chassis system control method comprising the steps of:

measuring wheel rotational velocities for a plurality of vehicle wheels;

estimating, in response to the measured wheel rotational velocities, absolute heave velocity of the vehicle body;

estimating, in response to the measured wheel rotational velocities, absolute pitch velocity of the vehicle body;

estimating, in response to the measured wheel rotational velocities, absolute roll velocity of the vehicle body;

developing a control command for the vehicle chassis system responsive to the estimated heave, pitch and roll velocities; and applying the control command to a vehicle chassis control system actuator.

2. A method comprising the steps of:

sensing a plurality of rotational velocity signals of a plurality of wheels of a vehicle;

estimating a relative heave between the plurality of wheels and the vehicle body responsive to the wheel rotational velocities;

estimating a relative roll between the plurality of wheels and the vehicle body responsive to the sensed wheel rotational velocities;

estimating a relative pitch between a plurality of wheels and the vehicle body responsive to the estimated wheel rotational velocities;

filtering the relative heave, roll and pitch estimations to obtain estimates of body modal heave, roll and pitch velocities; and developing an actuator control command responsive to the estimated body heave, roll and pitch velocities; and applying the actuator control command to an actuator.

3. The method of claim 2 wherein the actuator is a variable force suspension system damper.

4. A method according to claim 2, wherein the plurality of rotational velocity signals comprise $\omega_{LF}$, $\omega_{RF}$, $\omega_{LR}$ and $\omega_{RR}$.

the estimated relative heave is represented by $H_R$, and the step of estimating the relative heave is includes:

$$H_R = (\omega_{LF} + \omega_{RF} + \omega_{LR} + \omega_{RR})/4,$$

the estimated relative roll is represented by $R_R$ and the step of estimating relative roll is responsive to a track width of the vehicle, TW, and includes:

$$R_R = (-\omega_{LF} - \omega_{LR} + \omega_{RF} + \omega_{RR})/(2*TW),$$

the estimated relative pitch is represented by $P_R$ and the step of estimating relative pitch is responsive to a wheel base of the vehicle, WB, and includes:

$$P_R = (-\omega_{LF} - \omega_{RF} + \omega_{LR} + \omega_{RR})/(2*WB).$$

* * * * *